United States Patent [19]

Heisch

[11] Patent Number: 5,774,724
[45] Date of Patent: Jun. 30, 1998

[54] SYSTEM AND METHOD FOR ACQUIRING HIGH GRANULARITY PERFORMANCE DATA IN A COMPUTER SYSTEM

[75] Inventor: Randall Ray Heisch, Georgetown, Tex.

[73] Assignee: International Business Machines Coporation, Armonk, N.Y.

[21] Appl. No.: 560,878

[22] Filed: Nov. 20, 1995

[51] Int. Cl.$^6$ .................................................. G06F 11/30
[52] U.S. Cl. ............................................................ 395/704
[58] Field of Search ................................. 395/704, 701, 395/185.01, 183.01, 184.01

[56] References Cited

U.S. PATENT DOCUMENTS

| | | | |
|---|---|---|---|
| 3,707,725 | 12/1972 | Dellheim | 395/704 |
| 4,503,495 | 3/1985 | Boudreau . | |
| 4,511,960 | 4/1985 | Boudreau . | |
| 4,541,048 | 9/1985 | Propster et al. . | |
| 4,873,630 | 10/1989 | Rusterholz . | |
| 4,972,314 | 11/1990 | Getzinger et al. . | |
| 5,093,914 | 3/1992 | Coplion et al. | 395/704 |
| 5,226,162 | 7/1993 | Daw | 395/704 |
| 5,265,254 | 11/1993 | Blasciak et al. | 395/704 |
| 5,297,274 | 3/1994 | Jackson | 395/704 |
| 5,367,550 | 11/1994 | Ishida | 395/704 |
| 5,446,900 | 8/1995 | Kimelman | 395/704 |
| 5,450,586 | 9/1995 | Kuzara et al. | 395/704 |

Primary Examiner—Kevin A. Kriess
Attorney, Agent, or Firm—Robert M. Carwell

[57] ABSTRACT

A microprocessor performance monitor and instruction address break point facility are interconnected to provide finer granularity and performance monitoring. The microprocessor is initialized to collect processor statistics preselected prior to performance monitoring. Application start and stop instruction breakpoint addresses are preselected from a software program bounding instructions for which such statistics are desired. An exception handler is installed for instruction address breakpoints (IAB), enabling and disabling the performance monitor and stop addresses, respectively. The IAB register is then initalized to the start address, and the statistics counters are cleared. Upon starting the application, when the application start address instruction is executed, the breakpoint handler obtains control and enables the performance monitor counters, which count the desired statistics after returning from the breakpoint handler. Before returning, the handler sets the IAB register to the stop address. When the application stop address is encountered, the breakpoint handler disables the performance monitor counters, and rearms the start address in the IAB register. The performance monitor counters are then read to determine the desired statistics for the specific sequence of code within the boundaries of the start and stop addresses in the application.

27 Claims, 3 Drawing Sheets

SYSTEM AND METHOD FOR ACQUIRING HIGH GRANULARITY PERFORMANCE DATA IN A COMPUTER SYSTEM

TECHNICAL FIELD

This invention relates to performance monitoring of computer systems and, more particularly, to systems and methods for improving the granularity of such monitoring.

BACKGROUND OF THE INVENTION

In the design and analysis of computer systems, which may include such tasks as program tuning, architecture design analysis, and the like, performance characteristics of the system are extremely important. Accordingly, a great deal of resource has been committed in the industry in order to develop tools and techniques which may be used to obtain such performance characteristics.

As an example, with respect to hardware and microprocessor design, it is conventional to provide performance monitors or counters built into the silicon for counting parameters of interest which may be extremely useful in the design process. Such parameters may include, for example, instruction cache misses, data cache misses, number of loads, number of stores, number of branches predicted incorrectly, and so forth. These counters are typically built in the silicon and rather than working off a timebase are typically simply turned on and off as desired, thereby counting the number of events transpiring between the on/off cycle. Thus for example, a performance monitor counter may be caused to count cache misses which, when they occur, bump the counter. Typically a number of preselected events may be programmed for the performance monitors to count, with bits being provided to turn the counter on and off so as to enable and disable counting as desired.

Unfortunately, the parameters which might be counted are typically preselected and thus some inherent limitations exist in this technique. However, more importantly, a more serious problem which arises with this technology is related not to what may be counted but rather where in the program execution the event is being counted. As an example, instructions in a program causing cache misses may occur anywhere in a program. Unfortunately, however, prior art systems could not map such cache misses back to particular instruction addresses in the program so as to enable corrective measures to be taken.

An illustrative example may be helpful in understanding the problem. Cache miss rates for an entire program, while interesting perhaps and somewhat helpful in enabling comparison between process performances, provide little helpful information to the designer as to why a particular miss rate is inordinately high. More specifically, this data provides few clues as to what specific lines of code may be contributing to the miss rates. Thus, a significant need arose to facilitate the correlation of counted parameters to a more narrow or granular component of code (such as on the block or sub-block level as opposed to the process level) in order to obtain information which would have more utility in the design and debug process.

Similar to the situation in hardware, in the software arena, such as in operating system design, similar capability existed in the prior art for monitoring certain aspects of software designs. One approach was to monitor operation of processes generally. However, it soon became apparent that this approach yielded information far too general to be of significant use. Thus, the practice arose of avoiding testing systems under heavy use so that measured performance could be more appropriately tied to specific processes. It thus became common to attempt to turn certain processes off in the computer system so as to limit system activity to specific processes and thus code of interest. While this approach seemed to improve the usefulness of the monitoring, nevertheless it was far too general to be of significant use.

Accordingly, the industry began to perform software performance monitoring on a much more detailed level, utilizing the ability of programmers to modify source code as needed to enhance the profiling detail which was desired. More specifically, it was well known in the art to be able to turn software counters on and off by setting flags so as to obtain counts of parameters related to specific blocks of code or specific procedures which were executing. Thus profiling ability progressed from monitoring performance of entire programs, to monitoring only certain preselected processes (by turning others off), to techniques for actually monitoring a given procedure with source code modifications.

Unfortunately, with the finer granularity in the software approach of performance monitoring, these improvements came with a price. There are several drawbacks associated with altering source code and embedding special calls so as to profile at a desired level of detail. Clearly, the programmer might insert a performance monitor or counter at desired points in a program, so as to turn a counter on before getting to a procedure, and to turn the counter off after leaving the procedure, all being accomplished in code. In this manner, a desired count of a parameter of interest might be obtained, such as the number of times a certain block or procedure or even some preselected lines of code executed.

However, in order to accomplish this, it is obvious that one must have access to the source code. With companies considering source code to be an extremely sensitive and valuable asset which they are reticent to license out, this is a significant limitation on the ability to conduct performance monitoring. Yet another serious drawback to this approach is that obviously after completing the tuning, debugging, and the like, it is necessary then to remove the flags which enabled the profiling, and then to recompile and build the program again. This is a laborious and time consuming task which resulted in this solution not being at all appropriate in many instances.

As an illustration of the software profiling presently available, reference is made herein to U.S. Pat. No. 5,355, 487, T. W. Keller et al, issued Oct. 11, 1994, entitled "Non Invasive Trace-Drive System and Method for Computer System Profiling". In the technology described in this reference, a sampling-based method is provided for determining where "hotspots" are in a program, e.g., instructions wherein the program is spending significant amounts of time. In operation, a timer is provided which is activated periodically in the kernel of an operating system. Every time the timer fires, an interrupt is taken, and automatically the state of the system (e.g., address locations of the instructions the program was executing at the time of interrupt) is saved. A history of these saved addresses is developed, whereupon a user may then attempt to understand where the program is spending significant time, e.g., where the hotspots are in the program.

A skilled programmer can draw significant conclusions from this data. For example, if there is an inordinately high cache miss, or low instructions per clock rate, the programmer may have a fairly well-educated guess as to what is causing these hotspots by examining the profile generated by the tool. Once the programmer has an idea from this profiling tool as to the identity of inefficient routines where significant processing time is being spent, the programmer may then examine the assembly or source code in an effort to cure the problem.

Although such profiling tools in the art have been extremely valuable, there are, however, significant limitations to them. They frequently do not provide effective ways to isolate specific small sequences of instructions which may be causing the problems. It is important to note that such profilers are not monitoring performance monitor items such as those previously detailed, including instruction or data cache misses, mispredicted branches or the like. Rather, they are merely profiling instructions addresses—in other words, compiling a list of a number of hits on addresses indicating the percentage of time in the program that certain code is being executed, e.g., the amount of time that statements associated with profiled instruction addresses are executing. Such a tool may indicate merely by reason of the relative amount of time being spent in a program executing instructions associated with certain addresses that this area may have a deficient design. However, this is not always the case inasmuch as even in well designed programs certain essential "hotspots" of code exist which execute more often than others. Accordingly, such a tool may require multiple hotspots to be examined to get at the source of the problem. In other words, such profiling tools are not providing performance monitoring, counting system activity such as cache misses, and mapping these counts back to a specific block of instructions, but rather are simply profiling frequency of occurrence of execution of instruction at specified addresses.

In summary then, although it is becoming more prevalent in microprocessor architecture design to provide the capability for collecting precise processor performance statistics, which are then utilized to improve performance and architecture, etc., these techniques have suffered from the serious drawback of their inability to support fine granularity monitoring. Such microprocessors typically may be automatically controlled only at the process level, and then only if the operating system supports such monitoring, as for example, in preserving a process monitoring bit in the operating system software. However, when tuning a program or analyzing architecture, as previously described, it is often not only desirable but extremely beneficial to be able to collect performance statistics at a much finer granularity, e.g., within a procedure, or at the basic block or sub-block level.

SUMMARY OF THE INVENTION

It is therefore one object of the present invention to provide an improved system and method for performance monitoring of computer systems.

Is yet another object of the invention to provide for finer granularity of performance monitoring of computer systems to within a procedure and at a basic block level.

It is still a further object of the invention to provide for finer granularity of performance statistics in computer systems while avoiding the necessity for hardware modifications to the microprocessor itself.

In accordance with a preferred embodiment of the invention, a microprocessor performance monitor and instruction address breakpoint facility are combined and interconnected so to as to provide such finer granularity in performance monitoring. An instruction address breakpoint may be set for any effective address in a program utilizing an instruction address breakpoint register (IABR). The IABR will cause an instruction address breakpoint exception when the instruction at that address is executed. By coupling the performance monitor and IABR functionality, the performance monitor may thereby be enabled and disabled on a per instruction address basis.

A microprocessor for which performance monitoring is desired is first initialized to collect desired processor statistics for certain functions preselected prior to performance monitoring. Application start and stop instruction addresses are preselected from a software program over which it is desired to collect such statistics. An exception handler is installed for the instruction address breakpoint, thereby enabling the performance monitor for the start address and disabling it for the stop address. The IABR is then initialized to the start address, whereupon the performance monitor statistics counters are cleared.

Upon starting execution of the application which is desired to be monitored with finer granularity, when the application start address is executed, the breakpoint handler obtains control and enables the performance monitor counters which then begin and continue counting the desired statistics, after returning from the breakpoint handler. Before returning, the breakpoint handler sets the IABR to the stop address. When the application stop address is encountered, the breakpoint handler disables the performance monitor counters, and then rearms the start address in the IABR. In a particular preferred embodiment, the breakpoint exception handler will require less than twenty instructions to implement, remain in real address mode wherein translation is turned off, and will require no special environment initialization, thereby minimizing monitoring overhead and bias. The performance monitor counters are then queried to determine the desired statistics for the specific sequence of code within the boundaries of the start and stop addresses in the application.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying figures wherein:

DETAILED DESCRIPTION OF THE PREFERRED EMBODIMENT

Figure 1:
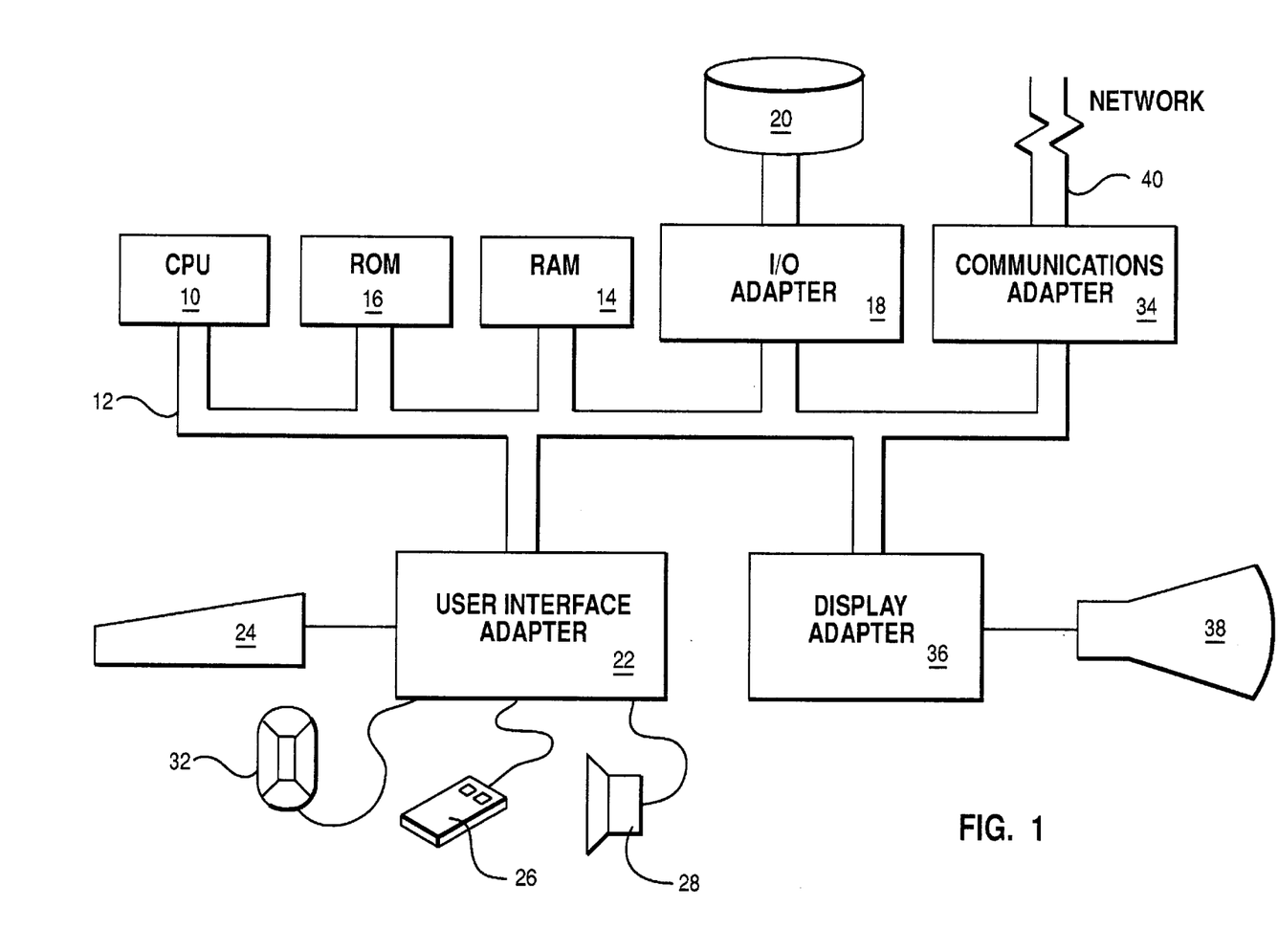
FIG. 1 is a block diagram of a computer system in which the performance monitoring of the present invention may be implemented.

Referring first to FIG. 1, a representative computer system is shown in which the system and method for acquiring fine granularity performance monitor data may be implemented effectively in accordance with the invention.

FIG. 1 illustrates a preferred embodiment of a computer system which may advantageously employ the performance monitor feature of the present invention. The system comprises a CPU 10, read only memory (ROM) 16, random access memory (RAM) 14, I/O adapter 18, user interface adapter 22, communications adapter 34, and display adapter 36, all interconnected via a common address/data/and control path or bus 12. Each of the above components accesses the common bus utilizing conventional techniques known to those of ordinary skill in the art, and includes such methods as dedicating particular address ranges to each component in the system, with the CPU being the busmaster. Other conventional techniques known to those of ordinary skill in the art employed in the system of FIG. 1 include direct memory access (DMA) used to transfer data at high speed from external devices such as DASD 20 or the network or the network shown to the data processing systems's RAM 14. As is further shown in FIG. 1, these external devices such as DASD 20 interface to a common bus 12 through respective adapters such as I/O adapter 18. Other external devices, such as the display 38 similarly use their respective adapter such as display adapter 36 to provide data flow between the bus 12 and the display 38 or other device. Various user interface means are provided for interconnection and use with the user interface adapter 22 which, in the figure, has attached thereto representative user input devices such as a joy stick 32, mouse 26, keyboard 24, and speaker 28. Each of these units is well known as such and accordingly will not be described in detail herein.

The invention admits to implementation on essentially any computer system and corresponding microprocessor, such as the RS/6000 (TM), RISC-based workstations and personal computers of the IBM Corporation executing the AIX (TM) and OS/2 (TM) operating systems, respectively, or similar machines of other vendors, which include for example in the case of an RS/6000 workstation a 604 PowerPC (TM) RISC chip (RS/6000, IBM, AIX OS/2 and PowerPC are trademarks of the IBM Corporation)

Contained with the CPU 10 of FIG. 1 typically is one or more microprocessor which performs the address, data, and control processing functions necessary for correction operation of the system of FIG. 1. Although the invention admits to application to various microprocessor designs, in the embodiment disclosed herein, the microprocessor preferably takes the form of a PowerPC 604 microprocessor manufactured by the IBM Corporation, which is a species of microprocessor known as a reduced instruction set computer (RISC) microprocessor. Further details regarding the architecture and operation of such a microprocessor may be obtained from the PowerPC 604 RISC Microprocessor Users Manual, Document #MPC604UM/AD, November, 1994, copyright IBM Corporation, which is incorporated herein by reference. Two components utilized in the invention may often be found separately in various computer systems and CPUs serving conventionally their own individual functions, namely an instruction address breakpoint register (IABR) with instruction address breakpoints (IAB) associated therewith, and various forms of performance monitors (PM) to be hereinafter described.

The basic operation of an IAB is as follows. First, an address of interest may be loaded into the IAB register, whereupon the microprocessor associated with the IABR executes program instructions while the register is monitored. The contents of the IAB register, more specifically, are compared to the address of the particular instruction executing at a given time. This function is shown by the IABR compare block 64 of FIG. 2.

At some point when, as a result of this comparison, it is detected that a preselected IAB address is equal to the address of the instruction currently to be executed, the microprocessor will detect this event. The processor will thereby be caused to break out of execution of the current program, whereupon execution will pass to an interrupt handler specifically initialized to handle that breakpoint or exception. This technique is a relatively common one often employed for debugging purposes and the like wherein it is desired to interrupt execution of a program at preselected points for various reasons. In other words, typically this IAB and associated IABR register allows a programmer to insert an instruction causing the microprocessor to stop operation at a special address and transfer control to another function for purposes of debug, or the like.

Figure 2:
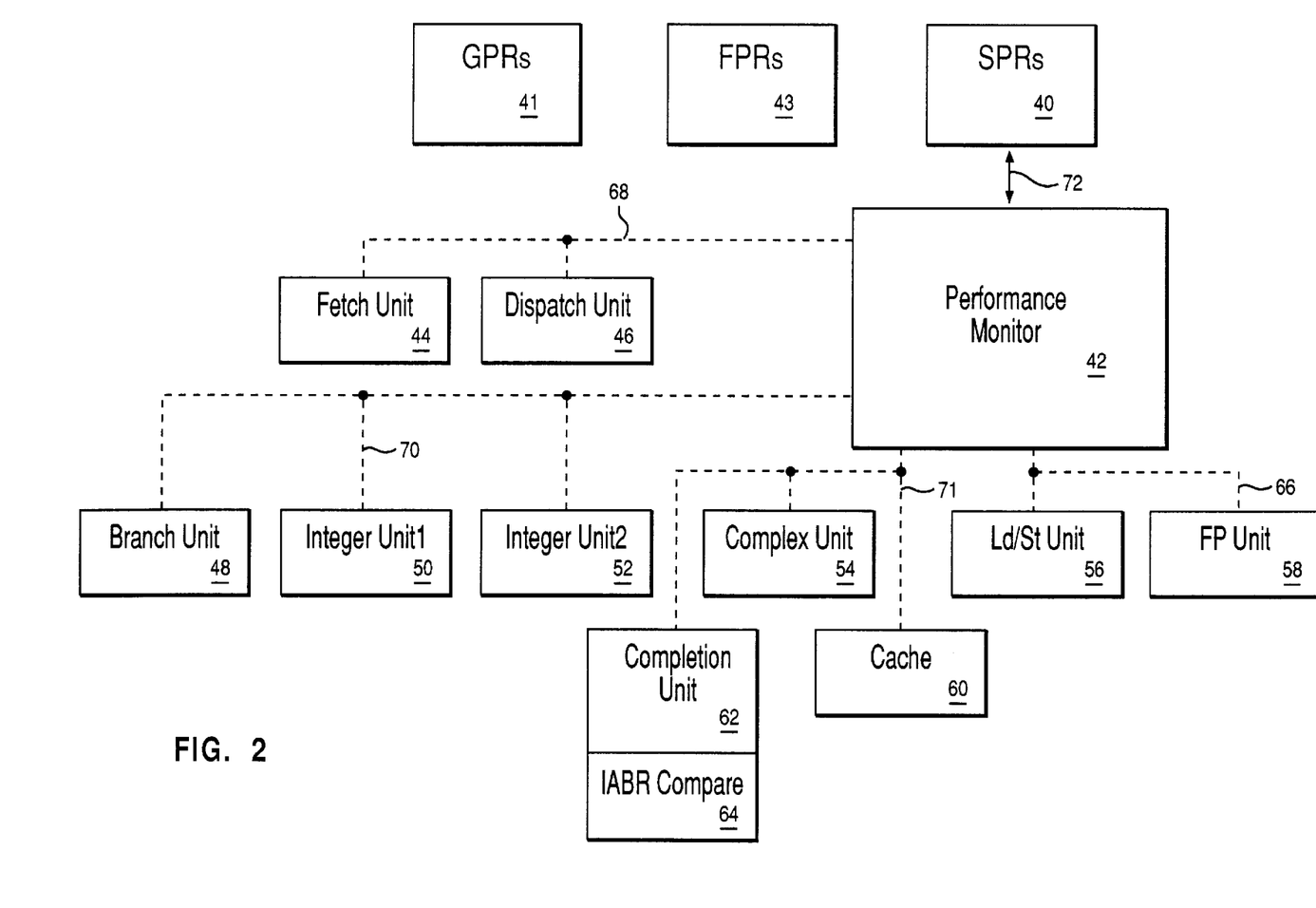
FIG. 2 is a block diagram showing, in more detail, the performance monitor and instruction address breakpoint components of the processor of FIG. 1.

More and more microprocessors are now further including performance monitors and associated counters, such as the performance monitor 42 shown in FIG. 2. The function of such performance monitors has been hereinbefore detailed. More precise explanation of operation of one embodiment of such performance monitors may be obtained from Chapter 9 of the aforementioned PowerPC 604 Users Manual incorporated herein by reference. It will be recalled that the function of such a performance monitor generally is to monitor and count preselected events such as processor clocks, cache misses, instructions dispatched to a particular execution unit, and so forth. The main utility of such performance monitors is to facilitate increased system performance by enabling design of more efficient processors and software, and thereby to improve processor architecture (as well as to assist in debugging efforts).

The performance monitor thus, in general, is a software-accessible mechanism which provides detailed information (e.g., counts) concerning the dispatch, execution, completion, and memory access of the microprocessor's instructions. When the performance monitor is invoked as a result of a threshold event which is detected, the exact addresses of the instruction and data which caused invocation of the performance monitor, (e.g., in particular the address of the last completed instruction during the cycle) is saved. This allows processing to resume whereupon the user may thereafter determine the part of the code that was executed when the count associated with the performance monitor was signalled.

In a typical embodiment, the performance monitor 42 includes counter registers which are interrupt driven whereby start and stop addresses are detected, which, in turn, cause the counters to be enabled and disabled, as desired. This feature will be capitalized upon and described in greater detail with reference to the flow diagram of FIG. 3.

In FIG. 2, a more detailed block diagram is provided of a portion of a typical implementation of a microprocessor comprising the CPU 10 of FIG. 1. Typically such a microprocessor includes various registers such as general purpose registers 41, floating point registers 43, and special purpose registers 40. Such a microprocessor also includes numerous processor units performing their own conventional tasks such as those depicted in blocks 44–62, whose functions are well known in the art. The performance monitor 42 serves the purpose of monitoring, e.g., counting pre-selectable events from the various processor units 44–62, such events being selectable as desired by programming prior to starting the performance monitoring. Further to this end, several of the special purpose registers 40 are thus reserved and assigned for use in controlling the performance monitor functions 42, as illustrated by the arrow 72. In like manner, the instruction address breakpoint (IAB) register is also assigned particular special purpose registers in the SPR block 40. Specifically, for example, memory locations are reserved for storing a desired stop and start address bounding to instructions in a program for which performance data is desired, wherein these stop and start instruction addresses correspond to a small component of code for which statistics are desired to be developed.

An IAB register compare function 64 is provided which is compared to the address of the next program instruction to be completed in the completion unit 62. Upon determination of a match by the IABR compare function 62 (i.e., the start or stop address currently loaded in the IABR is identical to the address of the next instruction to be completed in the completion unit 62), upon detection of such a match, an exception is created for handling by the interrupt handler to be described with reference to FIG. 3.

The purpose of the lines such as 66, 68, 70, 71 is to indicate that, as previously described, the performance monitor 42 may be programmed as desired to generate counts associated with a number of respective parameters, the particular selection of these parameters being preprogrammed. Thus, if it is desired to count cache misses, this interconnection between the performance monitor 42 and cache 60 illustrated by arrow 71 indicates that such a statistic may be generated by the performance monitor 42 as desired.

Figure 3:
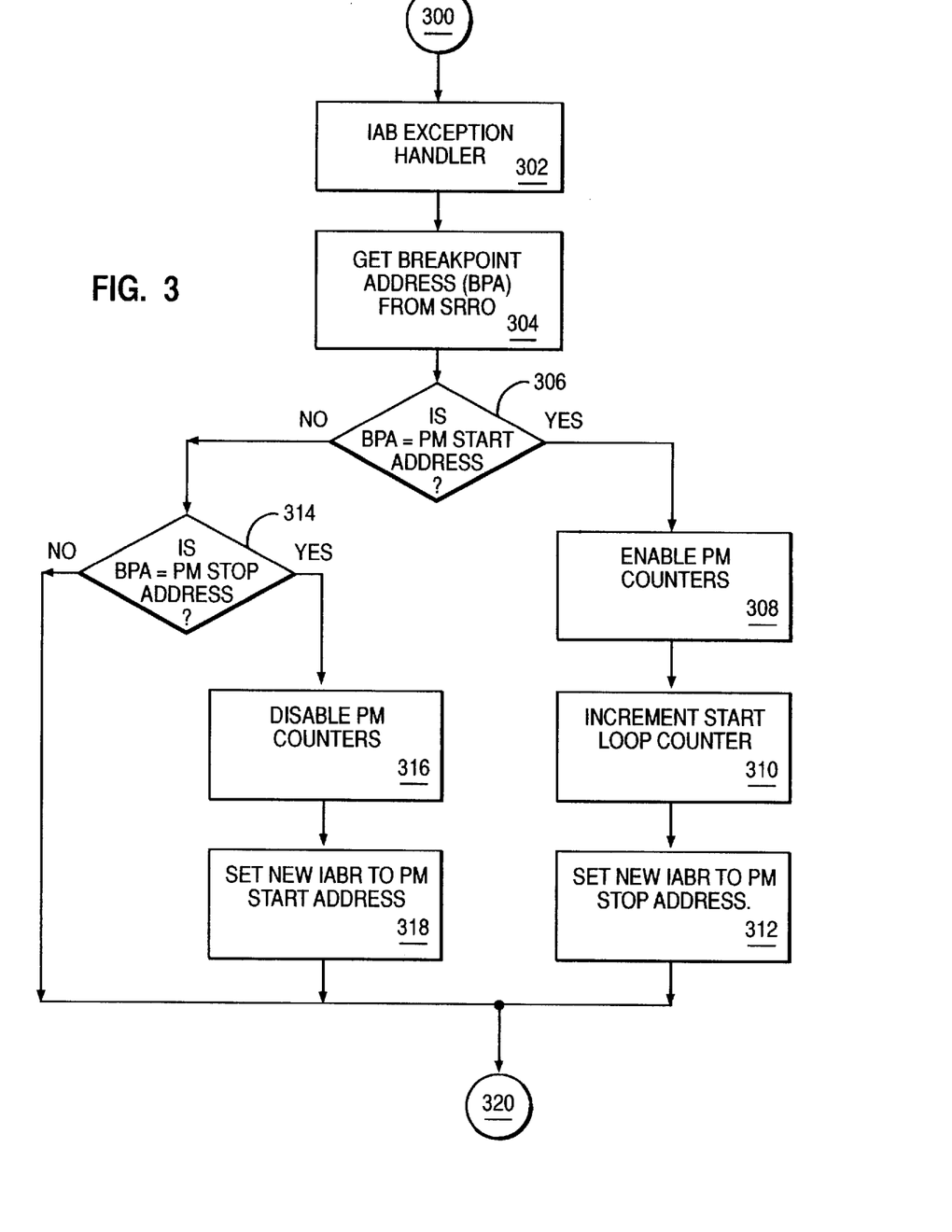
FIG. 3 is a flow diagram illustrating the flow of operation of program code implementing the performance monitoring of the present invention when executing in conjunction with the system of FIG. 1, including the performance monitor and instruction address breakpoint facility of FIG. 2.

A detailed example now follows of using the instruction address breakpoint (IAB) to enhance the performance monitor (PM) granularity, with reference to the general flow diagram of FIG. 3 and Table 1 which follows:

TABLE 1

| Line | | | |
|---|---|---|---|
| 1 | 0x10016768 | srai r6,r0,ox2 | |
| 2 | 0x1001676c | lil r0,0x38 | |
| 3 | 0x10016770 | stb r0,0x61(r1) | |
| 4 | 0x10016774 | sri r0,r6,0x1f | |
| 5 | 0x10016778 | a r4,r6,r0 | |
| 6 | 0x1001677c | lil r26,0xc | <------Start PM counters |
| 7 | 0x10016780 | srai r9,r4,0x1f | |
| 8 | 0x10016784 | liu r6,0x6666 | |
| 9 | 0x10016788 | sri r0,r9,0x1f | |
| 10 | 0x1001678c | ai r7,r6,0x6667 | Collect PM statistics for this code block |
| 11 | 0x10016790 | a r6,r1,r26 | |
| 12 | 0x10016794 | xor r9,r4,r9 | |
| 13 | 0x10016798 | cmpi cr1,r4,0x0 | |
| 14 | 0x1001679c | bne cr1,0x10016780 | |
| 15 | 0x100167a0 | a r10,r9,r0 | <------Stop PM counters |
| 16 | 0x100167a4 | mul r0,r7,r10 | |
| 17 | 0x100167a8 | srai r0,r0,0x2 | |
| 18 | 0x100167ac | sri r9,r0,0x1f | |
| 19 | 0x100167b0 | a r9,r0,r9 | |
| 20 | 0x100167b4 | sli r0,r9,0x3 | |

Table 1 includes an example excerpt of an assembly code sequence from an application program for which performance monitoring is desired, the code excerpt being the particular portion of the program of interest for which performance monitor statistics are desired.

In operation, and with reference to FIG. 3, the IAB exception handler is installed, 302, which will be invoked when the routine of FIG. 3 is entered at 300 upon occurrence of an exception. The IAB PM start address, shown in line 6 of Table 1, is set to OX1001677c. In like manner, the IAB PM Stop Address, shown in line 15 of Table 1, is set to 0X100167a0. It will be appreciated that these lines 6, 15, correspond to the point when the microprocessor will start and stop performance measurement counters, respectively.

Next, the IAB start loop counter is cleared and the IABR is set to 0X1001677c (line 6 of Table 1). The performance monitor is also programmed to collect the desired statistics such as cache misses, etc. The application is then ready to be started, such application obviously containing the code sequence monitored shown in Table 1.

When the instruction at the address of the program, "0X1001677c", e.g., the Start Address is executed, the IAB exception will occur to be handled by the IAB exception handler step 302. This exception handler 302 will compare the address of the exception from the save-restore register (SRRO) which saves the address/data of the last-executed instruction to the PM Start Address of line 6. More specifically, the breakpoint address (BPA) will be obtained from the SRRO as shown at step 304, and then per decision box 306, it will be determined whether this BPA is equal to the PM Start Address of 0X1001677c. If it is, as indicated by exiting along the "yes" path to the right of box 306, the PM counters will then be started or re-enabled, 308, and the start loop counter 310 will be incremented. The IAB exception handler, 302, will also reset the IAB register (IABR) to the PM Stop Address "0X100167a0", shown at block 312 of FIG. 3.

The PM counters will then continue to run, collecting the desired performance measurement statistics until the instruction at address "0X100167a0" (e.g., the Stop Address of line 15 of Table 1) is executed. Referring to FIG. 3 this may be seen by the left branch of the figure. More particularly, in the decision block 306, if it is thus determined that the breakpoint address is not the PM Start Address, this causes execution along the "No" branch to the left of block 306. Execution continues with the collection of PM statistics until down the left path of FIG. 3, with a query at each pass through the loop whether the BPA is equal to the PM Stop Address of 0X100167a0, shown as line 15 in Table 1. So long as this stop address is not equal to the break point address, the process falls through the left branch out of block 314, causing a loop back through the routine to continue gathering PM statistics.

However, once the BPA is equal to the PM stop address, as detected at block 314, this causes branching to the right down the "Yes" path. The IAB exception caused by execution down the "No" path of block 314, the IAB exception handler, after matching the breakpoint exception address to the PM Stop Address per block 314, will then disable the PM counters, 316, and reset the new IABR to the PM Start Address, 318. This process then continues through execution of the application, wherein the PM counters repeatedly get started or re-enabled and stopped or disabled with each entrance and exit to the desired code block containing the instruction for which performance monitoring is desired in the addresses of the block 0X1001677c through 0X100167a0. It will be appreciated that the PM counters may be read as desired, along with the start loop counter, in order to determine PM statistics for that particular code block.

Now that an overall discussion has been provided of FIG. 3, more detailed comments hereinafter follow. First, it will be appreciated that in order to effect the instruction handling capability for the instruction address breakpoint register, obviously it is necessary to install an instruction address breakpoint exception handler into the code of the operating system. The handler's purpose is to obtain control of the machine when the instruction address breakpoint occurs so that when program execution seeks to execute an instruction, because an address of interest is in the IAB register, the program will take an IAB exception. This causes transfer of control to the piece of code installed in the operating system for handling the performance monitoring.

It is important to note, however, that unlike profiling techniques of the prior art involving custom modification of source code at points of interest in a program to be profiled, this provision for an IAB exception handler is a one-time generic modification in the operating system. All of the problems associated with multiple custom source code modifications hereinbefore detailed are thus avoided.

Once the handler 302 is invoked, the address from where the interrupt occurred is saved, because when handling of the exception is completed, it is necessary to return control back to the point in the program from which the exception occurred. Thus, the save restore register (SRRO) is provided to perform this function of storing the address of the instruction that the program was executing when the exception occurred. With this in mind, it should be evident that the purpose of block 306 of FIG. 3 is to determine whether this saved address is an address where it is desired to start the performance monitoring counters. In order to do so, it is necessary to initialize two variables, namely the addresses at which it is desired to start and stop counting with respect to the performance monitor (shown at lines 6 and 15 of Table 1). If the block 306 determines that the breakpoint addresses when the exception occurred are the ones where it is desired to start or stop performance monitoring, obviously these are the points at which to enable/disable the PM counters, 308. It will be recalled it is desired to count the number of occurrence of a particular parameter during the time the program is executing the code between the PM Start and Stop Addresses. It should be noted that the program execution could loop through this code between the start and stop addresses several times. Accordingly a loop counter may be provided so that this fact may be taken into consideration in arriving at a determination of the number of times a certain performance parameter occurred for a single loop through the code.

The loop count indicates the number of times the counters were started. When an application is completed and the performance statistics are desired, the performance monitor counters are read, from which a value such as PMC1=N is obtained. Also, the loop count L is determined. Assuming the PMC1 was sent to count processor cycles, then the average number of cycles required to execute one pass through the block of code will be given by N/L.

Similarly, continuing with FIG. 3, obviously the purpose of the IAB register detecting that the PM Stop Address has been reached is for purposes of taking another exception and turning the counters off, giving rise to the decision block 314 of FIG. 3. Once block 306 has determined the BPA is not a PM Start Address, it is necessary to query whether the BPA is the pre-specified Stop Address as per block 314. These Start and Stop Addresses are the necessary information set in the exception handler itself. As per block 304, when the breakpoint address is obtained from the SRRO, this in actuality means physically placing the address in the IABR of the location in the program where it is desired to start the performance monitoring, e.g., the precise breakpoint desired in the code. It will be noted that the performance monitor will have already been programmed for the parameters which are desired to be measured prior to entering the code loop of FIG. 3 when the application is started. The application obviously will spin in the loop of the code block contained between the addresses of where the PM counters are started and stopped (e.g., the code included in lines 7–14 of Table 1) for the normal time which is required by the program for execution of this loop. When the loop is fallen out of when a Stop address is encountered, because an IABR has been set at this Stop Address so another exception may be taken, each time this occurs, the counters are turned off and the IABR is set back to the start address again. Then, all of the statistical data in the performance monitor counters will be examined and, of course, divided by the number of times through which the loop was traversed to obtain a number of the cache misses per a single pass through the loop or whatever the other desired parameter to be measured is.

Whereas an illustration of the invention has been shown employing an instruction address breakpoint register, the invention is not intended to be limited to this embodiment. Rather, it admits to more general applicability to address breakpoint registers permitting execution to break at any particular address, regardless of whether it is an instruction or data address. Similarly, the performance monitor, while conventionally associated with counting cache hits, and the like, is simply a mechanism indirectly connected with the microprocessor hardware which may be more generally employed in other environments such as multiprocessor environments. In this application, the more general breakpoints discussed with reference to the generalized address breakpoint register may be utilized in order to signal, for example, between microprocessors in a multiprocessing environment when address hits have occurred, to perform other functions as desired.

While the invention has been shown and described with reference to particular embodiments thereof, it will be understood by those skilled in the art that the foregoing and other changes in form and detail may be made therein without departing from the spirit and scope of the invention.

I claim:

1. A method for acquiring fine granularity hardware performance monitor data for a microprocessor architecture design associated with a computer program operating in a computer system, comprising:

preselecting start and stop hardware address breakpoints bounding a portion of said computer program for which said performance monitor data is desired;

executing said computer program;

hardware performance monitoring for occurrence of said start and stop address breakpoints during said execution; and activating and deactivating said hardware performance monitoring to acquire said hardware performance monitor data at a subprocess level.

2. The method of claim 1 wherein said monitoring comprises:

detecting occurrence of said start and stop address breakpoints; and wherein said activating and deactivating comprises:

activating a performance monitor counter in response to said detecting occurrence of said start address breakpoint; and deactivating said performance monitor counter in response to said detecting occurrence of said stop address breakpoint.

3. The method of claim 2 further including preselecting a performance monitor parameter prior to said executing; and wherein said counter counts occurrences of events corresponding to said performance monitor parameter.

4. The method of claim 3 wherein address breakpoints are instruction address breakpoints.

5. The method of claim 4 further including recording at said occurrence of said start address breakpoint an address at which said program was executing last prior to said occurrence of said start address breakpoint; and resuming said executing of said program at said address at which said program was executing after said occurrence of said stop address breakpoint.

6. The method of claim 5 wherein said detecting steps activate, in response thereto, an address breakpoint exception handler.

7. The method of claim 6 wherein said address breakpoint exception handler enables said counter of said performance monitor in response to said detecting of said start and said stop address breakpoints, respectively.

8. The method of claim 7 wherein said system includes an instruction address breakpoint register; and wherein said method further includes alternately setting said address breakpoint register with said exception handler to said start and said stop address breakpoints, respectively.

9. The method of claim 8 further including counting the number of times during said executing that said portion of said computer program executes; and adjusting said count of occurrences of said parameter in response to said counting the number of times said portion executes.

10. An apparatus for acquiring fine granularity hardware performance monitor data for a microprocessor architecture design associated with a computer program operating in a computer system, comprising:

means for preselecting start and stop hardware address breakpoints bounding a portion of said computer program for which said performance monitor data is desired;

means for executing said computer program;

hardware performance monitor means for monitoring for occurrence of said start and stop address breakpoints during said execution; and means for activating and deactivating said hardware performance monitoring to acquire said hardware performance monitor data at a subprocess level.

11. The apparatus of claim 10 wherein said means for monitoring comprises:

means for detecting occurrence of said start and stop address breakpoints; and wherein said means for activating and deactivating comprises:

means for activating a performance monitor counter in response to said means for detecting occurrence of said start address breakpoint; and means for deactivating said performance monitor counter in response to said detecting occurrence of said stop address breakpoint.

12. The apparatus of claim 11 further including means for preselecting a performance monitor parameter prior to said executing; and wherein said counter counts occurrences of events corresponding to said performance monitor parameter.

13. The apparatus of claim 12 wherein address breakpoints are instruction address breakpoints.

14. The apparatus of claim 13 further including means for recording at said occurrence of said start address breakpoint an address at which said program was executing last prior to said occurrence of said start address breakpoint; and means for resuming said executing of said program at said address at which said program was executing after said occurrence of said stop address breakpoint.

15. The apparatus of claim 14 wherein said means for detecting steps activates, in response to said detecting, an address breakpoint exception handler.

16. The apparatus of claim 15 wherein said address breakpoint exception handler enables said counter of said performance monitor in response to said means for detecting of said start and said stop address breakpoints, respectively.

17. The apparatus of claim 16 wherein said system includes an instruction address breakpoint register; and wherein said apparatus further includes means for alternately setting said address breakpoint register with said exception handler to said start and said stop address breakpoints, respectively.

18. The apparatus of claim 17 further including means for counting the number of times during said executing that said portion of said computer program executes; and means for adjusting said count of occurrences of said events in response to said means for counting the number of times said portion executes.

19. A computer program product for acquiring fine granularity hardware performance monitor data for a microprocessor architecture design associated with a computer program operating in a computer system, said computer program product comprising:

a computer usable medium having computer readable program code means embodied in said medium for effecting said acquiring of said data, said computer program product having computer readable program code means for preselecting start and stop hardware address breakpoints bounding a portion of said computer program for which said performance monitor data is desired;

computer readable program code means for executing said computer program;

computer readable program code means for hardware performance monitoring for occurrence of said start and stop address breakpoints during said execution; and computer readable program code means for activating and deactivating said hardware performance monitoring to acquire said hardware performance monitor data at a subprocess level.

20. The computer program product of claim 19 wherein said computer readable program code means for monitoring comprises:

computer readable program code means for detecting occurrence of said start and stop address breakpoints; and wherein said computer readable program code means for activating and deactivating comprises:

computer readable program code means for activating a performance monitor counter in response to said means for detecting occurrence of said start address breakpoint; and computer readable program code means for deactivating said performance monitor counter in response to said detecting occurrence of said stop address breakpoint.

21. The computer program product of claim 20 further including computer readable program code means for preselecting a performance monitor parameter prior to said executing; and wherein said counter counts occurrences of events corresponding to said performance monitor parameter.

22. The computer program product of claim 21 wherein address breakpoints are instruction address breakpoints.

23. The computer program product of claim 22 further including computer readable program code means for recording at said occurrence of said start address breakpoint an address at which said program was executing last prior to said occurrence of said start address breakpoint; and computer readable program code means for resuming said executing of said program at said address at which said program was executing after said occurrence of said stop address breakpoint.

24. The computer program product of claim 23 wherein said computer readable program code means for detecting steps activates, in response to said detecting, an address breakpoint exception handler.

25. The computer program product of claim 24 wherein said address breakpoint exception handler enables said counter of said performance monitor in response to said computer readable program code means for detecting of said start and said stop address breakpoints, respectively.

26. The computer program product of claim 25 wherein said system includes an instruction address breakpoint register; and wherein said computer readable program code means further includes computer readable program code means for alternately setting said address breakpoint register with said exception handler to said start and said stop address breakpoints, respectively.

27. The computer program product of claim 26 further including computer readable program code means for counting the number of times during said executing that said portion of said computer program executes; and computer readable program code means for adjusting said count of occurrences of said events in response to said means for counting the number of times said portion executes.

* * * * *